United States Patent Office 3,574,743
Patented Apr. 13, 1971

3,574,743
N-ACYL DERIVATIVES OF 2-HYDROXY-PHENYLAMINES
Keith Coupland, Hull, England, assignor to Distillers Chemicals and Plastics Limited, London, England
No Drawing. Filed Mar. 10, 1967, Ser. No. 622,045
Claims priority, application Great Britain, Apr. 6, 1966, 15,385/66
Int. Cl. C07c *103/30*
U.S. Cl. 260—558                    10 Claims

ABSTRACT OF THE DISCLOSURE

N-acyl derivatives of 2-hydroxyphenylamines are produced from the corresponding disubstituted catechols and are useful as lubricant additives.

---

The present invention relates to a class of novel compounds having good antioxidant and copper corrosion characteristics when used in lubricant compositions.

It is well known that many excellent antioxidants for lubricating compositions unfortunately possess properties which lead to corrosion, particularly copper corrosion, when used for example in engines. Consequently, this corrosive tendency of the antioxidant has to be suppressed by the addition of anti-corrosion agents to the lubricating composition.

Certain 2-hydroxy phenylamines improve the resistance of lubricants to oxidation. It has now been discovered that these compounds may be modified to give novel compounds which, when used in lubricant compositions, retain their excellent antioxidant properties but in addition show improved copper corrosion characteristics when used in lubricant compositions.

Accordingly the present invention provides compounds of the formula

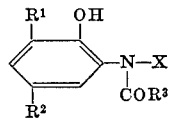

in which $R^1$, $R^2$ represent alkyl, aralkyl, alkenyl or aralkenyl radicals, and $R^3$ represents an alkyl, aralkyl or aryl radical, X represents a phenyl radical, a naphthyl radical, a biphenyl radical, a phenyl radical substituted with alkyl, alkoxy or halogen, or a radical of the formula

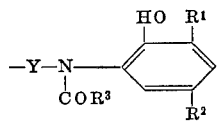

wherein Y is an arylene radical and $R^1$, $R^2$ and $R^3$ have the designation noted above.

The positions on the aromatic rings which are shown unsubstituted in the above formula may, if desired, be occupied by further substituents, for example alkyl radicals or halogen atoms.

According to one aspect of the invention, the group Y is a para-phenylene radical, a meta-tolylene radical, a para-xylylene radical, a radical of formula

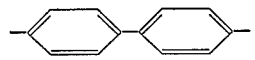

or a group of formula

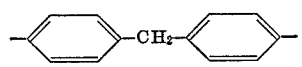

In one preferred aspect of the invention, the radical X is of formula

in which $R^4$ represents an alkyl radical, an alkoxy radical or a halogen atom, for example a methyl radical, an ethoxy radical or a chlorine atom respectively.

The radical $R^1$ should be a bulky substituent, for example a tert-butyl, α-methylbenzyl or α,α-dimethylbenzyl radical, and preferably contains from 4 to 12 carbon atoms. The radicals $R^2$, $R^3$ and $R^4$ preferably also contain from 1 to 12 carbon atoms. Although it is not essential, it is often convenient that $R^1$ and $R^2$ are identical radicals. $R^3$ may be for example a methyl or phenyl group.

Compounds according to the present invention may be prepared by the condensation reaction of disubstituted catechols of formula

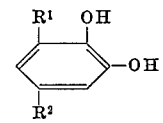

with aromatic amines or diamines in a suitable solvent such as alcohol or a petroleum fraction, with or without the addition of a basic catalyst such as triethylamine, followed by acylation of the amino group. The acylation may be carried out by any suitable means, for example the reaction of the substituted diphenylamine with an acid anhydride, acid chloride, a ketene, or a substance that will produce ketene, for example isopropenyl acetate.

The invention also provides lubricant compositions comprising a lubricant base and one or more of the novel compounds as hereinbefore described as antioxidant.

As specific compounds which, according to the invention are used as additives in lubricant compositions, the N-acetyl and N-benzoyl derivatives of the following are mentioned by way of example:

3,5-di-tert-butyl-2-hydroxy-4'-methyl-diphenylamine,
3,5-di-tert-butyl-2-hydroxy-4'-chloro-diphenylamine,
3,5-di-tert-butyl-2-hydroxy-4'-ethoxy-diphenylamine,
N,N'-di(3,5-di-tert-butyl-2-hydroxyphenyl)-orthophenylenediamine, and the compounds of formulae

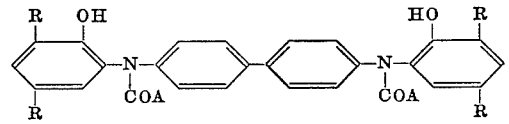

and

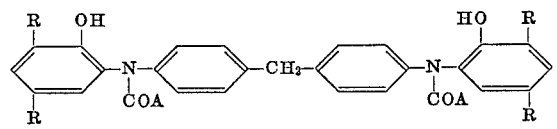

where R is a tert-butyl radical and A is a methyl or phenyl radical.

The lubricant base can be, for example, a hydrocarbon oil of the type used in crankcase oil formulations for internal combustion engines. Alternatively, the lubricant base can be a synthetic lubricant, for example an alkyl ester of an aliphatic dicarboxylic acid, such as dioctyl sebacate or a lubricant base of the type described in British Pat. 1,036,692.

Lubricant compositions of the invention may additionally contain additives such as corrosion inhibitors, viscosity index improvers, pour point depressants, dispersants and detergents. The effect of adding conventional metal deactivators, such as benzotriazole, to the formulations is also shown in the table.

The invention will be further understood by reference to the examples.

EXAMPLE 1

22.2 g. ditertbutyl catechol was dissolved in n-pentane and mixed with a solution of 10.5 g. p-toluidine in the same solvent. A few drops of triethylamine were added, and the mixture set aside to crystallise. When the deposition of products was complete, the mixture was filtered to give 2-hydroxy-3,5-ditert-butyl-4'-methyl diphenylamine as the product. The product was washed with a little heptane and dried. The yield was almost quantitative, and the structure of the product was confirmed by infra-red spectroscopy, mass spectrometry and nuclear magnetic resonance as well as by elemental analysis.

EXAMPLE 2

32 g. of material of Example 1 was dissolved in acetic acid and 12 g. of acetic anhydride added. The mixture was brought to reflux with stirring. After 2 hours reflux the mixture was poured into water and the solid filtered off. The solid was recrystallised from ethanol to give a white powder in high yield. This material was identified by molecular weight, infra-red spectroscopy and chemical analysis as:

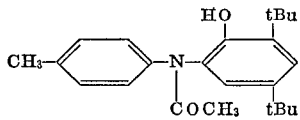

EXAMPLE 3

32 g. of material of Example 1 was dissolved in pyridine and 14.5 g. of benzoyl chloride added. Rapid reaction ensued, and pyridine hydrochloride was precipitated. The pyridine salt was removed by fintration, and the product isolated by precipitation from water. An almost quantitative yield of off-white crystals was obtained. This material was identified as:

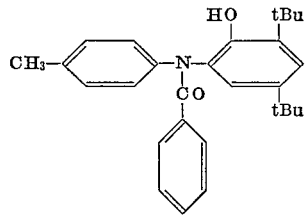

EXAMPLE 4

31 g. of material of Example 1 was dissolved in pyridine and 7.9 g. of acetyl chloride added dropwise. A rapid reaction ensued and pyridine hydrochloride was precipitated. The product was isolated by precipitation from water to give buff crystals. These were further purified by washing and recrystallisation from ethanol to give material identical with that produced in Example 2.

EXAMPLE 5

2-hydroxy-3,5-ditert-butyl-4'-methyl diphenylamine (1 gm. mole) was charged to a 2 litre flask. This was dissolved in acetone (1000 ml.) and ketene introduced into the rapidly stirred solution. The ketene addition was stopped when 1 gm. mole had been absorbed. A temperature rise from 25° to 45° C. was observed. On cooling the solution, a pale grey solid precipitated from solution. The solid was washed with acetone (100 ml.) to yield white crystals melting at 205–8° C., and identified by infra-red spectroscopy as [N-acetyl-2-hydroxy-3,5-ditert-butyl-4'-methyl diphenylamine].

An oxidation/corrosion test in the presence of copper was used to assess the properties of the materials of Examples 1, 2 and 3.

In this test air is passed at a rate of 2 litres/hour into a 40 g. sample of the test fluid maintained at 425° F. for 48 hours. A copper test piece of surface area 10 cm.$^2$ is immersed in the test fluid throughout the test. The metal weight loss, and the viscosity increase and weight loss of the test fluid, are reported in the following table.

TABLE

| Base fluid | Antioxidant (percent) | Corrosion inhibitor (percent) | Copper corrosion (mg./cm.$^2$) | Fluid viscosity increase (percent) | Fluid weight loss (percent) |
|---|---|---|---|---|---|
| Trimethylolpropane tricaprylate (TMPTC). | None | None | 0.02 | 260 | 16.1 |
| | Material Ex. 1 (0.5) | do | 1.60 | 130 | 8.0 |
| | Material Ex. 2 (0.5) | do | 0.68 | 85 | 12.1 |
| | Material Ex. 2 (2.0) | do | 0.55 | 85 | 10.5 |
| | Material Ex. 2 (0.5) | Benzotriazole (0.1) | 0.16 | 250 | 14.6 |
| | Material Ex. 2 (2.0) | do | 0.29 | 100 | 10.8 |
| 66% TMPTC+34% Ketoester of Example 1 of B.P. 1,036,692. | None | None | 0.01 | 102 | 8.0 |
| | Dioctylphenothiazine. | do | 5.3 | | |
| | do | Benzotriazole (0.1) | 0.35 | 52 | 5.7 |
| | Material Ex. 2 (0.5) | None | 2.8 | 16 | 6.8 |
| | do | Benzotriazole (0.2) | 0.19 | 63 | 6.6 |
| | Material Ex. 3 (0.5) | None | 3.8 | 38 | 5.2 |
| | do | Benzotriazole (0.1) | 2.4 | 54 | 3.6 |

I claim:
1. A compound of the formula

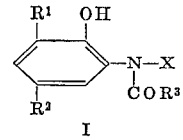

in which R$^1$ and R$^2$ are selected from the group consisting of tert-butyl and α-methylbenzyl, R$^3$ is methyl or phenyl, X is (a) phenyl, (b) phenyl substituted with lower alkyl, lower alkoxy or chlorine, or (c)

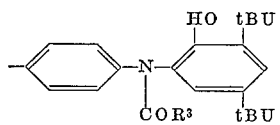

or a moiety of the formula

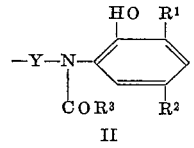

wherein R$^1$, R$^2$ and R$^3$ are as defined above, and wherein Y is

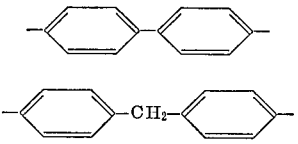

2. A compound according to claim 1 wherein $R^1$ and $R^2$ are each tert-butyl and X is

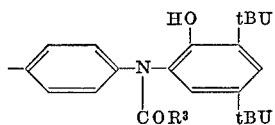

4-tolyl, 4-chlorophenyl or 4-ethoxyphenyl.

3. The compound 2-hydroxy-3,5-ditert-butyl-4'-methyl-N-acetyl-diphenylamine of formula

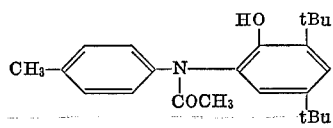

4. The compound 2-hydroxy-3,5-ditert-butyl-4'-methyl-N-benzoyl-diphenylamine of formula

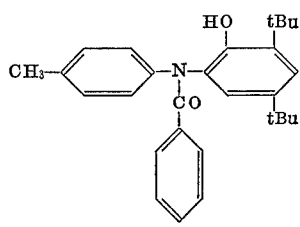

5. The N-acetyl and N-benzoyl derivative of 3,5-ditert-butyl-2-hydroxy-4'-chloro-diphenylamine.

6. The N-acetyl and N-benzoyl derivative of 3,5-ditert-butyl-2-hydroxy-4'-ethoxy-diphenylamine.

7. The N-acetyl and N-benzoyl derivative of N,N'-di-(3,5 - di - tert-butyl-2-hydroxyphenyl)-ortho-phenylenediamine.

8. A compound of the formula

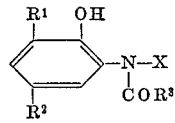

wherein $R^1$ and $R^2$ are selected from the group consisting of tert-butyl and α-methylbenzyl, $R^3$ is methyl or phenyl and X is 4-tolyl, 4-chlorophenyl or 4-ethoxyphenyl.

9. The compound

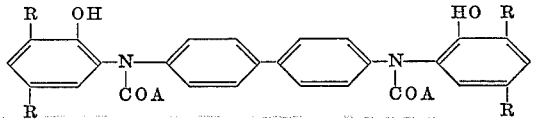

wherein R is tert-butyl and A is methyl or phenyl.

10. The compound

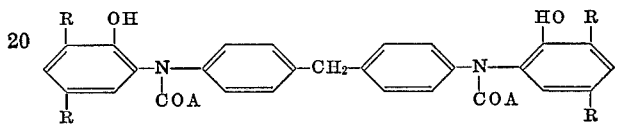

wherein R is tert-butyl and A is methyl or phenyl.

References Cited
UNITED STATES PATENTS
3,344,185   9/1967   Leonard _____ 260—558

HENRY R. JILES, Primary Examiner

H. I. MOATZ, Assistant Examiner

U.S. Cl. X.R.

760—562, 243, 308; 752—401, 56, 59